US011874920B2

(12) United States Patent
Strogov et al.

(10) Patent No.: US 11,874,920 B2
(45) Date of Patent: Jan. 16, 2024

(54) SYSTEMS AND METHODS FOR PREVENTING INJECTIONS OF MALICIOUS PROCESSES IN SOFTWARE

(71) Applicant: Acronis International GmbH, Schaffhausen (CH)

(72) Inventors: Vladimir Strogov, Moscow (RU); Serguei Beloussov, Costa del Sol (SG); Stanislav Protasov, Singapore (SG)

(73) Assignee: Acronis International GmbH, Schaffhausen (CH)

( * ) Notice: Subject to any disclaimer, the term of this patent is extended or adjusted under 35 U.S.C. 154(b) by 123 days.

(21) Appl. No.: 17/542,556

(22) Filed: Dec. 6, 2021

(65) Prior Publication Data
US 2022/0207139 A1 Jun. 30, 2022

Related U.S. Application Data

(60) Provisional application No. 63/132,043, filed on Dec. 30, 2020.

(51) Int. Cl.
*G06F 21/52* (2013.01)
*G06F 21/55* (2013.01)
*G06F 9/54* (2006.01)

(52) U.S. Cl.
CPC ............ *G06F 21/556* (2013.01); *G06F 9/545* (2013.01); *G06F 21/52* (2013.01); *G06F 2221/033* (2013.01)

(58) Field of Classification Search
USPC .......................................................... 726/23
See application file for complete search history.

(56) References Cited

U.S. PATENT DOCUMENTS

| | | | | |
|---|---|---|---|---|
| 8,560,295 | B1 * | 10/2013 | Santan | G06F 30/33 703/15 |
| 8,589,681 | B1 * | 11/2013 | Fanton | G06F 21/52 709/224 |
| 11,677,761 | B2 * | 6/2023 | Venkatramani | H04L 63/20 726/23 |

(Continued)

FOREIGN PATENT DOCUMENTS

CN 104715209 B * 8/2017

*Primary Examiner* — Sakinah White Taylor
(74) *Attorney, Agent, or Firm* — ArentFox Schiff LLP; Michael Fainberg (57) ABSTRACT

Disclosed herein are systems and methods for preventing malicious injections. In one aspect, a method includes monitoring active processes that are running in suspended mode. For each active process being monitored, the method includes injecting a dynamic link library (DLL) into the active process to hook an application programming interface (API) of an application corresponding to the active process, wherein the DLL is injected for tracking commands for suspension and resumption of the active process. The method includes monitoring file inputs and outputs of the application for anomalies while the active process is in the suspended mode, and when a command for resuming the active process is detected using the DLL, determining, based on the monitoring, whether a malicious process is inserted into the active process. The method includes allowing the suspended process to resume execution in response to determining that no malicious process is inserted in the active process.

21 Claims, 4 Drawing Sheets

(56) References Cited

U.S. PATENT DOCUMENTS

| | | | |
|---|---|---|---|
| 2007/0055711 A1* | 3/2007 | Polyakov | G06F 21/566 707/999.203 |
| 2010/0024036 A1* | 1/2010 | Morozov | G06F 21/74 726/26 |
| 2014/0123280 A1* | 5/2014 | Kedma | G06F 11/3003 726/23 |
| 2015/0379267 A1* | 12/2015 | Szor | G06F 21/566 726/23 |

* cited by examiner

SYSTEMS AND METHODS FOR PREVENTING INJECTIONS OF MALICIOUS PROCESSES IN SOFTWARE

CROSS-REFERENCE TO RELATED APPLICATIONS

This application claims the benefit of U.S. Provisional Application No. 63/132,043, filed Dec. 30, 2020, which is herein incorporated by reference.

FIELD OF TECHNOLOGY

The present disclosure relates to the field of protection of software from malicious attackers (e.g., by insertion of generic malware or a ransomware).

BACKGROUND

At present, users rely on communication networks to access various types of services. For example, user endpoint devices, such as phones, computers, etc., are ubiquitously used for accessing voice and data services. In order to support these services, the communications service providers attempt to ensure that the application software used to access services is from a reputable source and contains no malicious process.

In some scenarios, a malicious process may be inserted into a software that is normally considered safe. For example, suppose that the Operating System (OS) of the user endpoint device (e.g., MICROSOFT WINDOWS®) can start/activate a process either in a running mode or in a suspended mode. The suspended mode is used by OSs to conserve computer Random Access Memory (RAM) by placing applications in a ready state rather than an execution state or a terminated state. For instance, the efficiency of the RAM may be improved by placing a process in suspended mode while waiting for a user input. When the process of an application is started in suspended mode, an attacker may insert a malicious process into the process that was previously considered trusted—thus going undetected.

SUMMARY

Aspects of the disclosure relate to the field of network security, more specifically to systems and methods for preventing insertions of malicious processes in software, i.e., prevent malicious process from being inserted in trusted processes.

In some aspects, the techniques described herein relate to a method for preventing insertions of malicious processes, the method including: monitoring, by a filter driver of a kernel mode of an operating system, active processes that are running in suspended mode; and for each active process being monitored, by a filter driver of the kernel mode: injecting a dynamic link library (DLL) into the active process to hook an application programming interface (API) of an application corresponding to the active process, wherein the DLL is injected for tracking commands for suspension and resumption of the active process; monitoring file inputs and outputs of the application for anomalies while the active process is in the suspended mode; when a command for resuming the active process is detected using the DLL, determining, based on the monitoring, whether a malicious process is inserted into the active process; and allowing the suspended process to resume execution in response to determining that no malicious process is inserted in the active process.

In some aspects, the techniques described herein relate to a method, wherein the monitoring of file inputs and outputs includes at least determining when a writing operation is being performed into memory.

In some aspects, the techniques described herein relate to a method, wherein the monitoring of file inputs and outputs includes at least determining when an address space of a file is being altered.

In some aspects, the techniques described herein relate to a method, further including: recording changes made to memory or address space into a special repository; when the command for resuming the active process is detected, transferring the recorded changes to an analyzer; and receiving results of an analysis from the analyzer indicating whether or not the changes are associated with the malicious process.

In some aspects, the techniques described herein relate to a method, further including: updating rules used for determining whether or not the malicious process is inserted in the active process based on the received results of the analysis.

In some aspects, the techniques described herein relate to a method, wherein the command for resuming the active process includes a kernel function that is used as an internal command in the operating system.

In some aspects, the techniques described herein relate to a method, further including: blocking the resumption of the active process when a writing into memory occurred between the suspension of the active process and reception of the command for resumption of the active process; or blocking the resumption of the active process when an address space of a file is replaced between the suspension of the active process and the reception of the command for resumption of the active process.

It should be noted that the methods described above may be implemented in a system comprising a hardware processor. Alternatively, the methods may be implemented using computer executable instructions of a non-transitory computer readable medium.

In some aspects, the techniques described herein relate to a system of a device for preventing insertions of malicious processes, including: a hardware processor a hardware processor communicatively coupled with memory and configured to execute a filter driver and an operating system (OS) operable in a user mode and a kernel mode; the filter driver of the kernel mode configured to: monitor active processes that are running in suspended mode; and for each active process being monitored: inject a dynamic link library (DLL) into the active process to hook an application programming interface (API) of an application corresponding to the active process, wherein the DLL is injected for tracking commands for suspension and resumption of the active process; monitor file inputs and outputs of the application for anomalies while the active process is in the suspended mode; when a command for resuming the active process is detected using the DLL, determine, based on the monitoring, whether a malicious process is inserted into the active process; and allow the suspended process to resume execution in response to determining that no malicious process is inserted in the active process.

In some aspects, the techniques described herein relate to a non-transitory computer readable medium storing thereon computer executable instructions for preventing insertions of malicious processes, including instructions for: monitoring, by a filter driver of a kernel mode of an operating system, active processes that are running in suspended mode; and for each active process being monitored, by a filter driver of the kernel mode: injecting a dynamic link library (DLL) into the active process to hook an application programming interface (API) of an application corresponding to the active process, wherein the DLL is injected for tracking commands for suspension and resumption of the active process; monitoring file inputs and outputs of the application for anomalies while the active process is in the suspended mode; when a command for resuming the active process is detected using the DLL, determining, based on the monitoring, whether a malicious process is inserted into the active process; and allowing the suspended process to resume execution in response to determining that no malicious process is inserted in the active process.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Exemplary aspects are described herein in the context of a system, method, and a computer program for preventing insertions of malicious processes. Those of ordinary skill in the art will realize that the following description is illustrative only and is not intended to be in any way limiting. Other aspects will readily suggest themselves to those skilled in the art having the benefit of the disclosure. Reference will now be made in detail to implementations of the example aspects as illustrated in the accompanying drawings. The same reference indicators will be used to the extent possible throughout the drawings and the following description to refer to the same or like items.

Insertion of a malicious process into a suspended process is a high-risk security threat because it may go undetected. In one example, the insertion of the malicious process may be performed by using a write memory method to replace safe content with malicious content. In another example, the insertion of a malicious process may be performed by replacing the address space of a file. Regardless of the method used to insert the malicious process, the attack occurs when the execution of the process is resumed. The verification on whether the process is trusted occurs prior to the process being placed in suspended mode. Therefore, the process continues to be considered a trusted process when the execution is resumed—thereby allowing the attack to occur undetected in real time. This type of attack is often detected only post-factum using digital forensic methods.

Therefore, there is a need for a more efficient method and system for detecting malicious processes in real time. Real time detection would enable the system to collect samples of malware for analysis and would strengthen the verification of trustworthiness of software.

In one aspect, a system for preventing insertions of malicious processes in accordance with the teachings of the present disclosure includes real-world devices, systems, components, and groups of components realized with the use of hardware such as integrated microcircuits (application-specific integrated circuit, ASIC) or field-programmable gate arrays (FPGA), or, for example, in the form of a combination of software and hardware such as a microprocessor system and set of program instructions, and also on neurosynaptic chips. The functionality of such system modules may be realized solely by hardware, and also in the form of a combination, where some of the functionality of the system modules is realized by software, and some by hardware. In certain aspects, some of the modules or all of the modules may be executed on the processor of a general-purpose computer (such as the one shown in FIG. 4). Furthermore, components of the system may be realized either within a single computing device or spread out among several interconnected computing devices.

Figure 1:
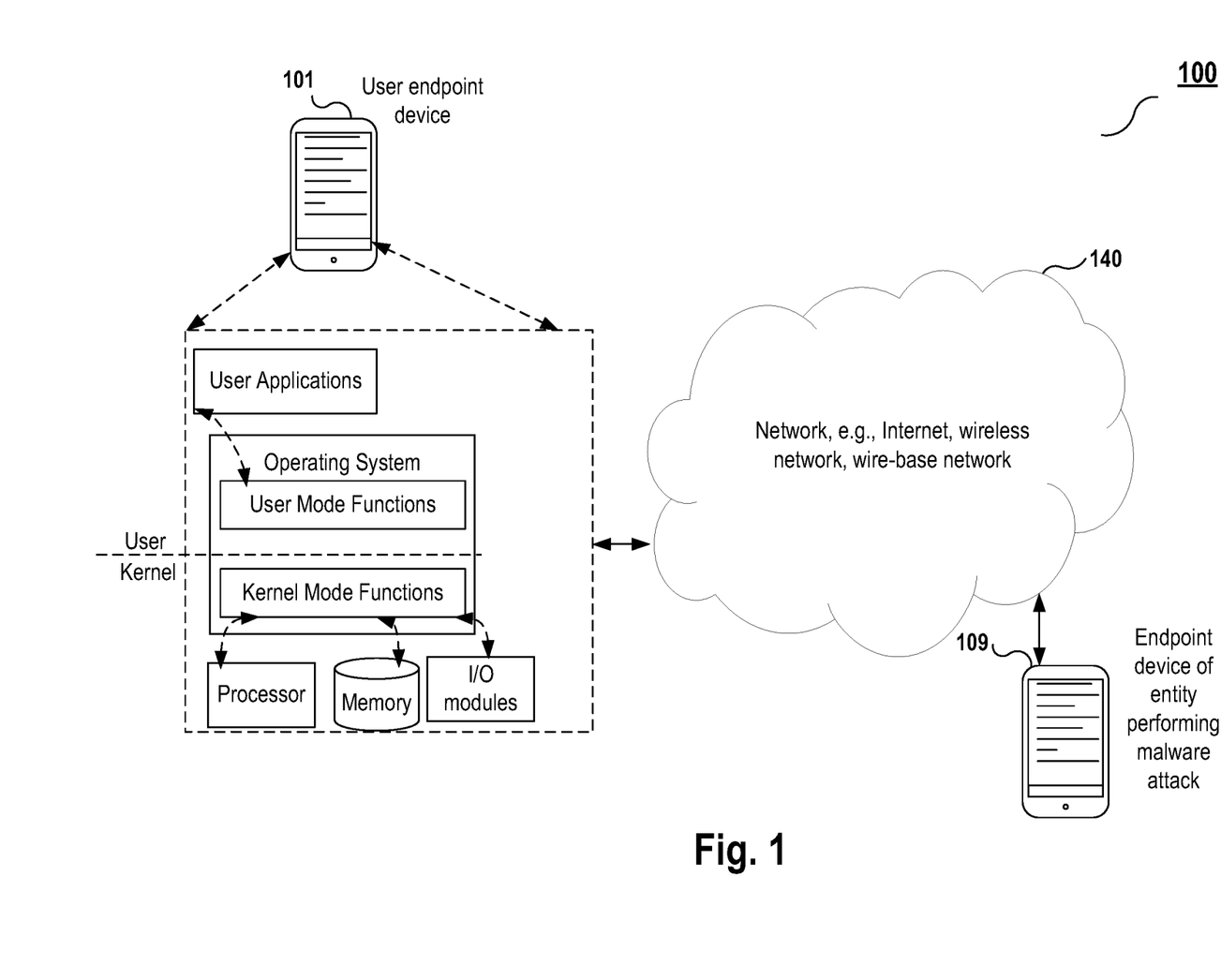
FIG. 1 is a block diagram illustrating an exemplary system for preventing insertions of malicious processes in accordance with aspects of the present disclosure.

FIG. 1 is a block diagram illustrating an exemplary system 100 for preventing insertions of malicious processes in accordance with aspects of the present disclosure. The system 100 includes a user endpoint device 101 accessing services via a network 140 and a device 109 used for launching an attack.

The device 109 is a representative device which may be used by any entity (person or company) for the purpose of launching a malicious activity on user endpoint devices or on servers in the network 140. The network 140 may include any number of wireless or wire-based communications networks, the Internet, etc.

In one aspect, the method of the present disclosure for preventing insertions of malicious processes is implemented in a user endpoint device (e.g., the user endpoint device 101).

Figure 2:
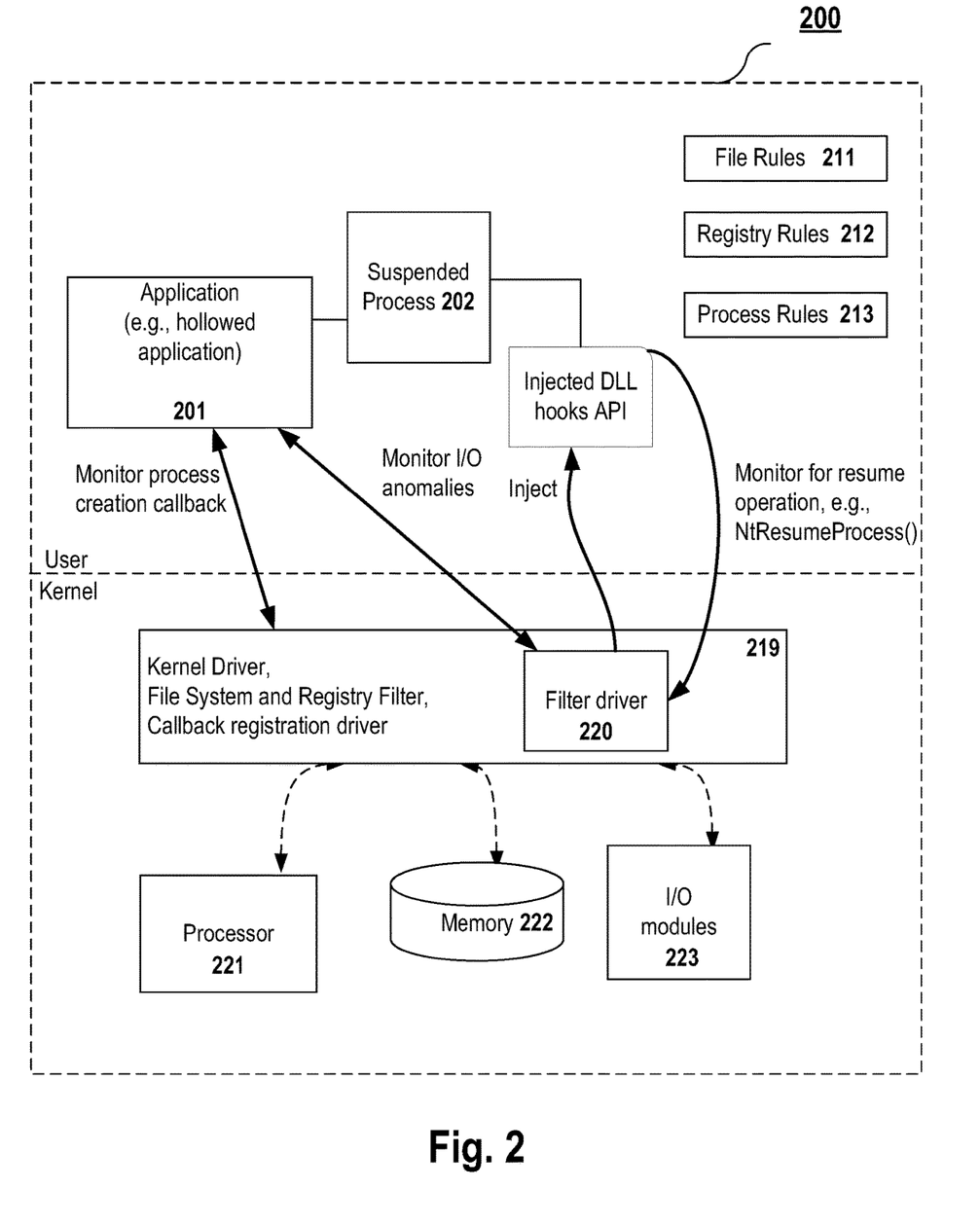
FIG. 2 is a block diagram illustrating an exemplary user endpoint device used for preventing insertions of malicious processes in accordance with aspects of the present disclosure.

FIG. 2 is a block diagram illustrating an exemplary user endpoint device 200 used for preventing insertions of malicious processes in accordance with aspects of the present disclosure.

The Operating System (OS) of the user endpoint device generally supports two modes: user mode and kernel mode. When the device is turned on, the OS starts in kernel mode. After the OS is loaded, user applications run in the user mode. Privileged instructions can be executed only in kernel mode. For example, interrupt instructions, I/O management, memory management, CPU scheduling, etc., are executed in the kernel mode. When the OS is running a user application, the system is in the user mode.

A transition to the kernel mode occurs when the application sends a request for executions that requires privileged access. Upon completion, the OS returns to the user mode. For example, suppose a system call occurs, for a user application 201. Then, the OS transition to the kernel mode occurs because the execution requires privileged access. Once the execution of the system call is finished, the transition back to the user mode follows.

A user application 201 may be invoked by a user of the endpoint device to start an application. The user application 201, while executing in the user mode, may request for an operation that can be executed only in the kernel mode. Then, the OS transitions from the user mode to the kernel mode. For instance, operations that access the processor 221 (e.g., scheduling), memory 222 (e.g., mapping), I/O modules 223 (e.g., access ports/interfaces), file rules 211, registry keys 212 (e.g., modifying registry keys), process rules 213 (e.g., altering processes or adding processes), and the like are performed when the OS is in the kernel mode.

A kernel mode driver 219 detects operations to which it registers for process notification call backs (e.g., for process creation callback). When a process of an application (e.g., user application 201) enters the suspended mode, the kernel mode driver 219 invokes the method of the present disclosure for monitoring the processes of the application. The filter driver 220 is used for monitoring all active processes that are running in suspended mode and controlling whether or not resuming the process is allowed, for example, based on whether or not a malicious process is inserted during the time in which the process was running in suspended mode. For example, the user application 201 may be a hollowed application (i.e., an application in which a malware is inserted). When the process of the user application is modified by either adding another process or replacing a process, the impacted application may be referred to as a "hollowed application". The hollowed application may then include ransomware, a generic malware, etc. The method of the present disclosure identifies hollowed applications with the use of functionalities of the kernel mode drivers of the user endpoint device.

In order to prevent malicious processes from being inserted into suspended processes, the method of the present disclosure enables suspended processes to transition to running mode only after determining whether or not the process remained trusted during the time in which the process was in suspended mode. Thus, in one aspect, the method of the present disclosure prevents the insertion of malicious process using filter driver 220 of the kernel mode. Filter driver 220 monitors active processes that are running in suspended mode (e.g., suspended process 202). For each active process being monitored, filter driver 220 injects a dynamic link library (DLL) into the active process (e.g., suspended process 202) to hook an API of application 201 corresponding to the active process. The DLL is injected for tracking commands for suspension and resumption of suspended process 202. Filter driver 220 monitors file inputs and outputs of application 201 while the active process remains in suspended mode to detect anomalies (e.g., changes in application 201). In response to detecting, via the DLL injection, a command for resuming suspended process 202, filter driver 220 analyzes the monitored file inputs and outputs and determines whether a malicious process was inserted in suspicious process 202 while it remained suspended. Filter driver 220 enables execution of the command and thus enables resuming the process in response to determining that no malicious process was inserted in suspended process 202.

Figure 3:
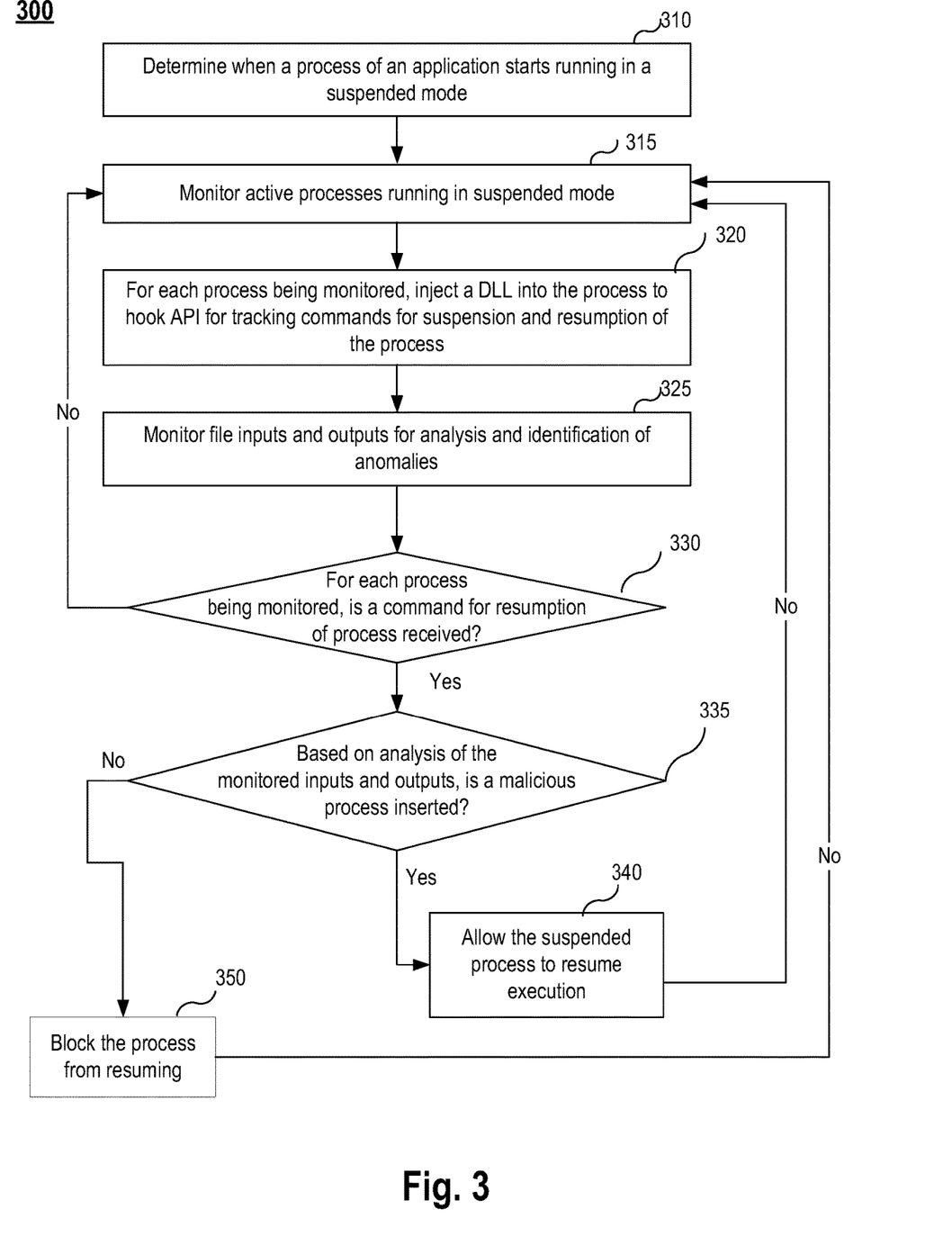
FIG. 3 is a flow diagram illustrating an exemplary method of a method for preventing insertions of malicious processes in accordance with aspects of the present disclosure.

FIG. 3 is a flow diagram illustrating an exemplary method 300 of a system for preventing insertions of malicious processes in accordance with aspects of the present disclosure.

In step 310, method 300, by a filter driver of the kernel mode, determines when a process of an application starts running in a suspended mode. For example, the OS determines that application 201 has been waiting for an input for at least a threshold period of time (e.g., 5 seconds). The OS reallocates RAM by placing the processes associated with application 201 in suspended mode (e.g., suspended process 202). Filter driver 220 detects the reallocation of memory and determines that the active process is now running in suspended mode. In step 315, method 300, by the filter driver of the kernel mode, monitors active processes running in suspended mode. Each process in suspended mode is monitored independently of other processes.

In step 320, for each process being monitored, filter driver 220 of the kernel mode, injects a dynamic link library (DLL) into the process to hook the API of the corresponding application. For example, filter driver 220 may perform a DLL injection in suspended process 202 in order to track commands for suspension and resumption of process 202. Thus, the behavior of the flow of API calls is modified such that information about API calls can be captured.

In step 325, for each process being monitored, filter driver 220 monitors file inputs and outputs of application 201 to identify anomalies. For example, filter driver 220 may monitor application 201 interactions to determine when there are I/O operations into memory. For instance, the monitoring may identify inputs and outputs for changing the address space of suspended process 202. While suspended process 202 remains suspended, changes to the application 201 should not occur. I/O operations associated with application 201 are likely signs of tampering. Thus, in one aspect, the monitoring of file inputs and outputs includes at least determining when a writing operation is being performed into memory 222. More specifically, the writing operation will change an attribute of application 201. For example, a file in a directory associated with application 201 may be deleted or modified. In another example, a new file may be written in the directory associated with application 201.

In one aspect, the monitoring of file inputs and outputs includes at least determining when an address space of a file of application 201 is being altered. For example, malware may insert a code replacing portions of the process or modifying the address space of the process.

In step 330, for each process being monitored, method 300 determines whether or not a command for resuming the process is received. For example, the filter driver of the kernel mode may determine for each process running in suspended mode, when a command to resume execution is received. When a command for resuming the process is received, the method proceeds to step 335. Otherwise, the method proceeds to step 315. In one aspect, the command for resumption of the process comprises a kernel function (e.g., NtResumeProcess( )), which is used as an internal command in the operating system.

In step 335, by the filter driver of the kernel mode, method 300 analyzes the monitored file inputs and outputs and determining whether or not a malicious process is inserted in the process. When no malicious process is inserted, the method proceeds to step 340. Otherwise, the method proceeds to step 350.

In step 340, method 300, allows the suspended process to resume execution. That is, the process exits the suspended mode and enters the running mode or execution state. In other words, the process is allowed only when no malicious process is inserted in the process. The method then proceeds to step 315. In step 350, method 300, blocks the process from resuming. The method then proceeds to step 315.

In one aspect, filter driver 220 may block the resumption of the process when a writing into memory occurred between the suspension of the process and the reception of the command for resumption of the process. In another aspect, filter driver 220 may block the resumption of the process when an address space of a file is replaced between the suspension of the process and the reception of the command for resumption of the process.

Suppose that application 201 is configured to identify text inside an input image and output a text file with the words in the identified text. The process associated with application 201 may enter suspended mode if an input image is not provided for a threshold period of time. While the process remains in suspended mode, a malicious entity may attempt to inject code in application 201 that sends the output text file to endpoint device 109—thus introducing a privacy issue. If the malicious entity is successful (e.g., a script of application 201 that handles where the output text file is sent is modified as described above), when the process re-enters an execution state, the next image provided will have its output text sent to endpoint device 109. Filter driver 220 detects the modification to the file associated with application 201 while suspended process 202 is in suspended mode and blocks suspended process from resuming (i.e., entering an execution state).

In some aspects, filter driver 220 may further generate an alert on user endpoint device 101 that indicates that a potentially malicious process has been injected into suspended process 202. The alert may request confirmation from an administrative user of user endpoint device 101 to confirm whether the potentially malicious process is indeed malicious. Referring to the example given previously, the alert may indicate that a modification has been made to application 201 and a process has been introduced that is sending the output text file to an unidentified IP address (i.e., an IP address of endpoint 109).

In one aspect, filter driver 220 may further record changes made to memory or the address space associated with application 201 into a special repository (e.g., into an isolated service in network 140). When the command for resumption of the process is detected, filter driver 220 may transfer the recorded changes to an analyzer. For example, the analyzer may be a thick client application that performs the functionality described of filter driver 220. Filter driver 220 on user endpoint device 101 may be a thin client application. Thus, local detection of process state changes may be performed by the thin client application and analysis of the modifications for anomalies may be performed by the thick client application. The thin client of filter driver 220 may then receive results of an analysis from the analyzer indicating whether or not the changes are associated with a malicious process.

In one aspect, the analyzer is implemented in the same user endpoint device. In another aspect, the analyzer is implemented on a cloud based network and accessed by the user endpoint device on demand. For example, a network service provider may provide a service that gathers information on suspected processes from various user endpoint devices, analyze the impact of the suspected process to assess a degree of harmfulness, and provide a verdict to the user endpoint device. The user endpoint device may then allow the process to exit the suspended mode upon confirmation that the inserted process is not malicious.

In one aspect, filter driver 220 may update rules used for determining whether or not a malicious process is inserted in the process based on the received results of the analysis. Referring to the example about text file generation, filter driver 220 may initiate a file rule, registry rule, and/or process rule that states that changes to files, the registry, and/or a process, respectively, made by an entity with the unidentified IP address should be blocked regardless of process state. In other words, the IP address may be blacklisted.

As described above, the present disclosure describes systems and methods for preventing insertions of processes by a malicious software. One advantage of the method of the present disclosure is that the user endpoint device is protected from process hollowing by malware.

Figure 4:
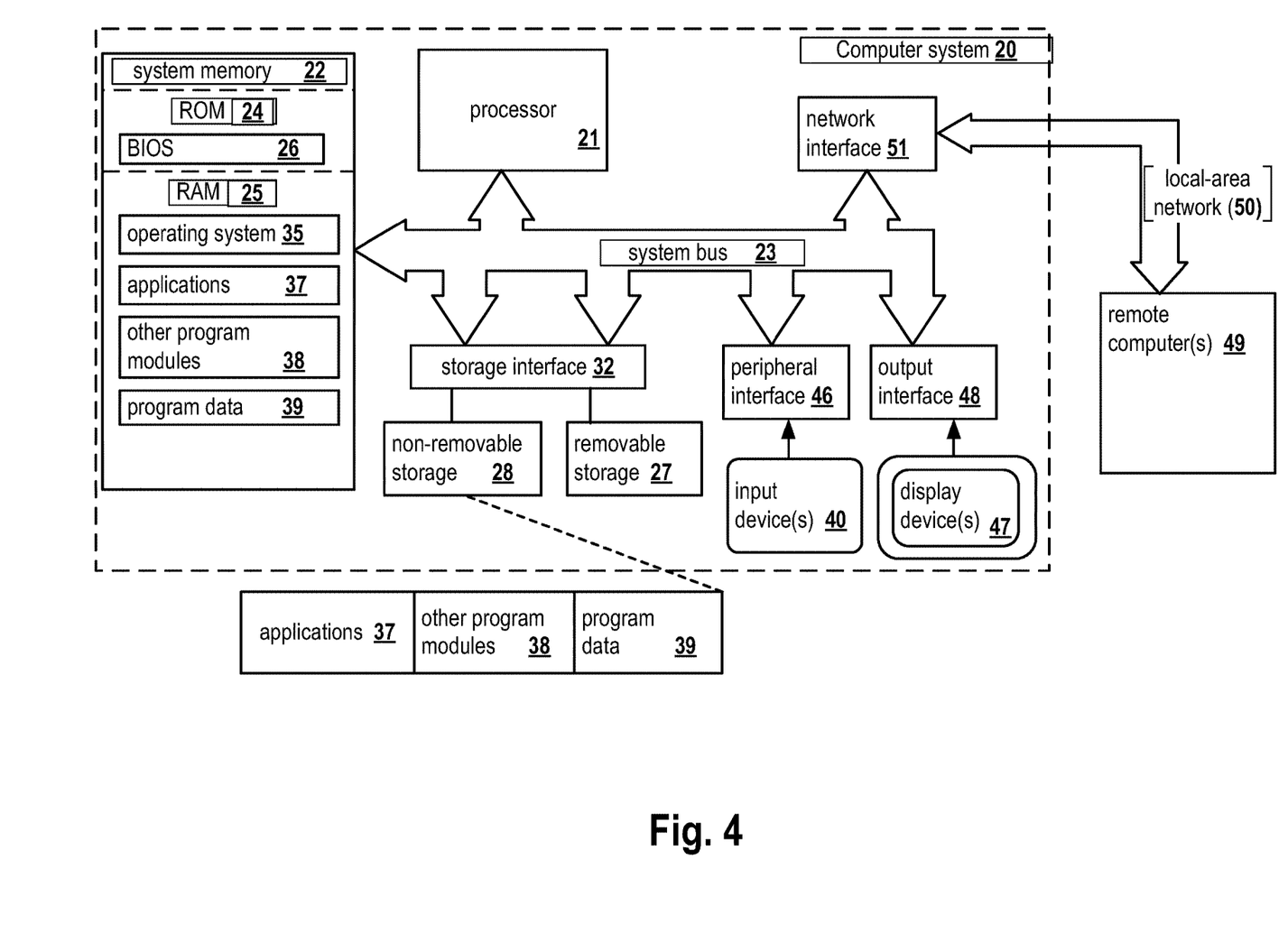
FIG. 4 presents an example of a general-purpose computer system on which aspects of the present disclosure can be implemented.

FIG. 4 is a block diagram illustrating a computer system 20 on which aspects of systems and methods for preventing insertions of malicious processes may be implemented. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, Hyper-Transport™, InfiniBand™, Serial ATA, I²C, and other suitable interconnects. The central processing unit 21 (also referred to as a processor) can include a single or multiple sets of processors having single or multiple cores. The processor 21 may execute one or more computer-executable code implementing the techniques of the present disclosure. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices.

The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some aspects, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system (such as the one described in greater detail in FIG. 4, above). Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of those skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for preventing insertions of malicious processes, the method comprising:
   monitoring, by a filter driver of a kernel mode of an operating system, active processes that are running in suspended mode; and
   for each active process of the monitored active processes, by a filter driver of the kernel mode:
      injecting a dynamic link library (DLL) into the active process to hook an application programming interface (API) of an application corresponding to the active process, wherein the DLL is injected for tracking commands for suspension and resumption of the active process;
      monitoring file inputs and outputs of the application for anomalies while the active process is in the suspended mode;
      when a command for resuming the active process is detected using the DLL, determining, based on the monitoring, whether a malicious process is inserted into the active process; and
      allowing the suspended process to resume execution in response to determining that no malicious process is inserted in the active process.

2. The method of claim 1, wherein the monitoring of file inputs and outputs includes at least determining when a writing operation is performed into memory.

3. The method of claim 1, wherein the monitoring of file inputs and outputs includes at least determining when an address space of a file is altered.

4. The method of claim 1, further comprising:
   recording changes made to memory or address space into a special repository;
   when the command for resuming the active process is detected, transferring the recorded changes to an analyzer; and
   receiving results of an analysis from the analyzer indicating whether or not the changes are associated with the malicious process.

5. The method of claim 4, further comprising:
   updating rules used for determining whether or not the malicious process is inserted in the active process based on the received results of the analysis.

6. The method of claim 1, wherein the command for resuming the active process comprises a kernel function that is used as an internal command in the operating system.

7. The method of claim 1, further comprising:
   blocking the resumption of the active process when a writing into memory occurred between the suspension of the active process and reception of the command for resumption of the active process; or
   blocking the resumption of the active process when an address space of a file is replaced between the suspension of the active process and the reception of the command for resumption of the active process.

8. A system of a device for preventing insertions of malicious processes, comprising:
   a memory;
   a hardware processor communicatively coupled with the memory and configured to execute an operating system (OS) operable in a user mode and a kernel mode; and
   a filter driver of the kernel mode, executed by the hardware processor, configured to:
      monitor active processes that are running in suspended mode; and
      for each active process of the monitored active processes:
         inject a dynamic link library (DLL) into the active process to hook an application programming interface (API) of an application corresponding to the active process, wherein the DLL is injected for tracking commands for suspension and resumption of the active process;
         monitor file inputs and outputs of the application for anomalies while the active process is in the suspended mode;
         when a command for resuming the active process is detected using the DLL, determine, based on the monitoring, whether a malicious process is inserted into the active process; and
         allow the suspended process to resume execution in response to determining that no malicious process is inserted in the active process.

9. The system of claim 8, wherein the monitoring of file inputs and outputs includes at least determining when a writing operation is performed into the memory.

10. The system of claim 8, wherein the monitoring of file inputs and outputs includes at least determining when an address space of a file is altered.

11. The system of claim 8, wherein the filter driver is further configured to:
    record changes made to the memory or address space into a special repository;
    when the command for resuming the active process is detected, transfer the recorded changes to an analyzer; and
    receive results of an analysis from the analyzer indicating whether or not the changes are associated with the malicious process.

12. The system of claim 11, wherein the filter driver is further configured to:
    update rules used for determining whether or not the malicious process is inserted in the active process based on the received results of the analysis.

13. The system of claim 8, wherein the command for resuming the active process comprises a kernel function which is used as an internal command in the operating system.

14. The system of claim 8, wherein the filter driver is further configured to:
    block the resumption of the active process when a writing into the memory occurred between the suspension of the active process and reception of the command for resumption of the active process; or
    block the resumption of the active process when an address space of a file is replaced between the suspension of the active process and the reception of the command for resumption of the active process.

15. A non-transitory computer readable medium storing thereon computer executable instructions for preventing insertions of malicious processes, including instructions for:
monitoring, by a filter driver of a kernel mode of an operating system, active processes that are running in suspended mode; and
for each active process of the monitored active processes, by a filter driver of the kernel mode:
injecting a dynamic link library (DLL) into the active process to hook an application programming interface (API) of an application corresponding to the active process, wherein the DLL is injected for tracking commands for suspension and resumption of the active process;
monitoring file inputs and outputs of the application for anomalies while the active process is in the suspended mode;
when a command for resuming the active process is detected using the DLL, determining, based on the monitoring, whether a malicious process is inserted into the active process; and
allowing the suspended process to resume execution in response to determining that no malicious process is inserted in the active process.

16. The non-transitory computer readable medium of claim 15, wherein the monitoring of file inputs and outputs includes at least determining when a writing operation is performed into memory.

17. The non-transitory computer readable medium of claim 15, wherein the monitoring of file inputs and outputs includes at least determining when an address space of a file is altered.

18. The non-transitory computer readable medium of claim 15, wherein the instructions further comprise instructions for:
recording changes made to memory or address space into a special repository;
when the command for resuming the active process is detected, transferring the recorded changes to an analyzer; and
receiving results of an analysis from the analyzer indicating whether or not the changes are associated with the malicious process.

19. The non-transitory computer readable medium of claim 18, wherein the instructions further comprise instructions for:
updating rules used for determining whether or not the malicious process is inserted in the active process based on the received results of the analysis.

20. The non-transitory computer readable medium of claim 15, wherein the command for resumption of the active process comprises a kernel function which is used as an internal command in the operating system.

21. The non-transitory computer readable medium of claim 15, the instructions further comprising instructions for:
blocking the resumption of the active process when a writing into memory occurred between the suspension of the active process and reception of the command for resumption of the active process; or
blocking the resumption of the active process when an address space of a file is replaced between the suspension of the active process and the reception of the command for resumption of the active process.

\* \* \* \* \*